(12) United States Patent
Dawson et al.

(10) Patent No.: US 7,469,533 B2
(45) Date of Patent: Dec. 30, 2008

(54) BRAKE TORQUE LOAD GENERATION PROCESS FOR DIESEL PARTICULATE FILTER REGENERATION AND SOX REMOVAL FROM LEAN NOX TRAP

(75) Inventors: Kent Dawson, Romeo, MI (US); William Ruona, Farmington Hills, MI (US); Michiel J. van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/380,631

(22) Filed: Apr. 27, 2006

(65) Prior Publication Data

US 2007/0251220 A1    Nov. 1, 2007

(51) Int. Cl.
*F01N 3/00* (2006.01)
(52) U.S. Cl. ............... 60/295; 60/274; 60/280; 60/285; 180/65.4; 180/65.6; 180/65.7
(58) Field of Classification Search .............. 60/274, 60/275, 280, 284, 285, 295, 297, 311, 247; 180/65.2, 65.3, 65.4, 65.6, 65.7
See application file for complete search history.

(56) References Cited

U.S. PATENT DOCUMENTS 5,323,868 A * 6/1994 Kawashima ............... 180/65.4
5,345,761 A * 9/1994 King et al. ................. 60/274
5,402,641 A   4/1995 Katoh et al.
5,716,586 A   2/1998 Taniguchi
6,434,928 B1 * 8/2002 Manaka ..................... 60/274
6,543,218 B2  4/2003 Ketcher
6,694,725 B2 * 2/2004 Furman et al. .............. 60/275
6,910,329 B2 * 6/2005 Bunting et al. ............. 60/297
6,912,848 B2 * 7/2005 Bedapudi .................... 60/297
2003/0232696 A1 12/2003 Shibagaki
2005/0086932 A1  4/2005 Cheong
2005/0148430 A1  7/2005 Graupner et al.

FOREIGN PATENT DOCUMENTS

| EP | 1437492 | 7/2004 |
|----|---------|--------|
| FR | 2820462 | 8/2002 |
| GB | 2326857 | 1/1999 |
| JP | 486319 | 3/1992 |
| WO | 0125606 | 4/2001 |
| WO | WO 2004/088100 | 10/2004 |

* cited by examiner

*Primary Examiner*—Binh Q Tran
(74) *Attorney, Agent, or Firm*—Julia Voutyras; Alleman Hall McCoy Russell & Tuttle, LLP

(57) ABSTRACT

A method of regeneration of an emission control device in a diesel engine of a vehicle having a wheel brake comprises receiving a generation request by an operator of the vehicle; activating the wheel brake; increasing engine torque; and regenerating the emission control device.

17 Claims, 4 Drawing Sheets

BRAKE TORQUE LOAD GENERATION PROCESS FOR DIESEL PARTICULATE FILTER REGENERATION AND SOX REMOVAL FROM LEAN NOX TRAP

FIELD

The present application relates to system and method of diesel particulate filter regeneration and/or SOx removal from a NOx absorbent using brake torque generation process.

BACKGROUND AND SUMMARY

Diesel and gasoline engine vehicles use emission control devices to reduce emissions produced during combustion. The durability of an emission control device may depend upon a regeneration process, which may require increased exhaust gas temperature. For example, lean NOx traps and/or particulate filters may be at least partially regenerated during increased exhaust temperature conditions, along with specific exhaust air-fuel ratio conditions.

Certain changes in driving conditions during a regeneration of an emission control device may cause temperature excursions (e.g., beyond an upper temperature limit) which may degrade the performance of the emission control device. In particular, the frequency and/or amplitude of high temperature excursions may increase where excess reductants and excess oxygen are present in the exhaust. Such conditions may occur during short trips (key on/off cycles), motoring (mountain driving), and/or continued low speed operation, for example.

One approach to provide more controlled regeneration is described in the Japan Patent No. 4,086,319, where a particulate filter is regenerated manually. Specifically, when a driver turns on a regeneration switch, an exhaust throttle valve actuator throttles the exhaust and acceleration actuator increases fuel injection to increase engine speed and the exhaust temperature for re-combustion of particulates.

However, the inventors herein have recognized several disadvantages of the '319 approach. For example, raising engine speed alone may not generate temperature high enough for the regeneration of a particulate filter. Further, the use of an exhaust throttle may increase cost and may decrease peak torque.

Thus, the above issues may be addressed by a method of regeneration of an emission control device in a diesel engine of a vehicle having a wheel brake and a transmission. The method comprises receiving a regeneration request by an operator of the vehicle; activating the wheel brake; increasing engine torque; and regenerating the emission control device.

According to another approach, a method is provided for the regeneration of an emission control device in a diesel engine of a vehicle having a wheel brake and a transmission. The method comprises receiving a regeneration request by an operator of the vehicle; adjusting transmission operation; increasing engine torque; and regenerating the emission control device.

In this way, it is possible to utilize engine loading via the wheel brakes, thereby enabling increased engine loading during various engine operation conditions such as at idle state. Further, it is possible to generate engine loading greater than that caused by increased friction operating at higher engine speeds. Furthermore, such operation may be advantageously initiated by an operator so that vehicle braking (which may be automatically controlled) may be performed under expected conditions. Thus, exhaust temperature may be raised to a level required for the regeneration by increasing engine torque that can be counteracted by a load torque, such as a brake torque.

Similarly, transmission operation, such as gear state, may be adjusted to enable brake torque on the engine (e.g., via the wheel brakes) and thus enable increased engine loading to provide exhaust temperature sufficient for regeneration during stationary vehicle conditions. In one embodiment, the approach may be used to remove SOx in a lean NOx trap or particles from a particulate filter, thus multiple emission control devices may be regenerated, possible at the same time.

DETAILED DESCRIPTION

Figure 1:
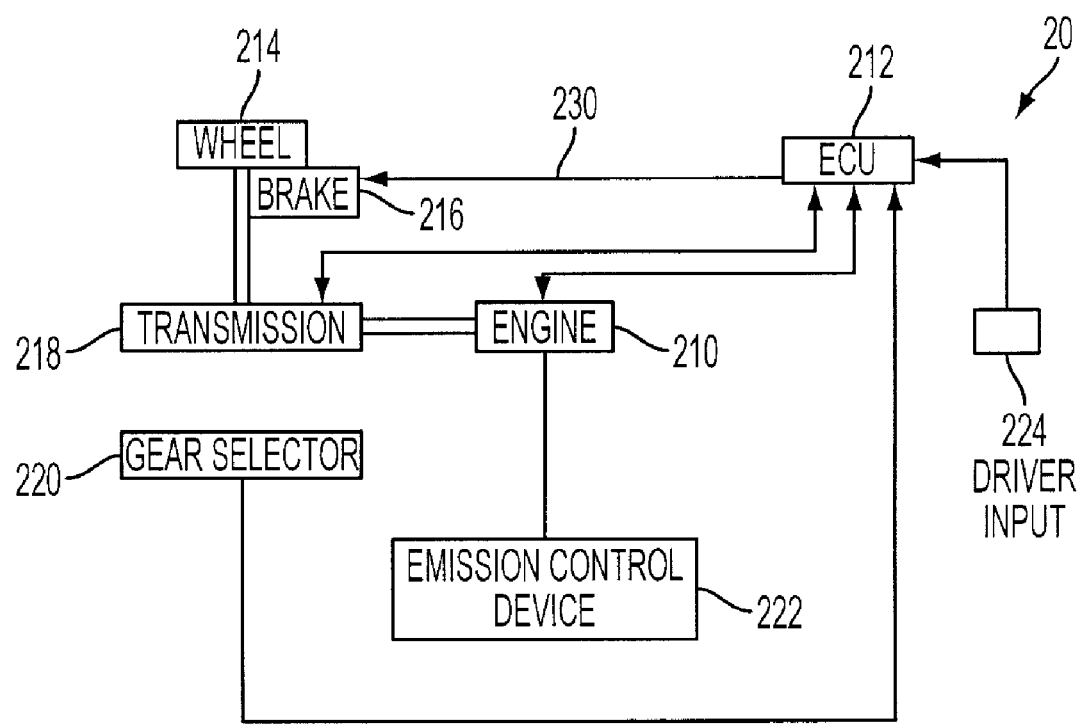
FIG. 1 is a schematic diagram of an example vehicle.
Figure 2:
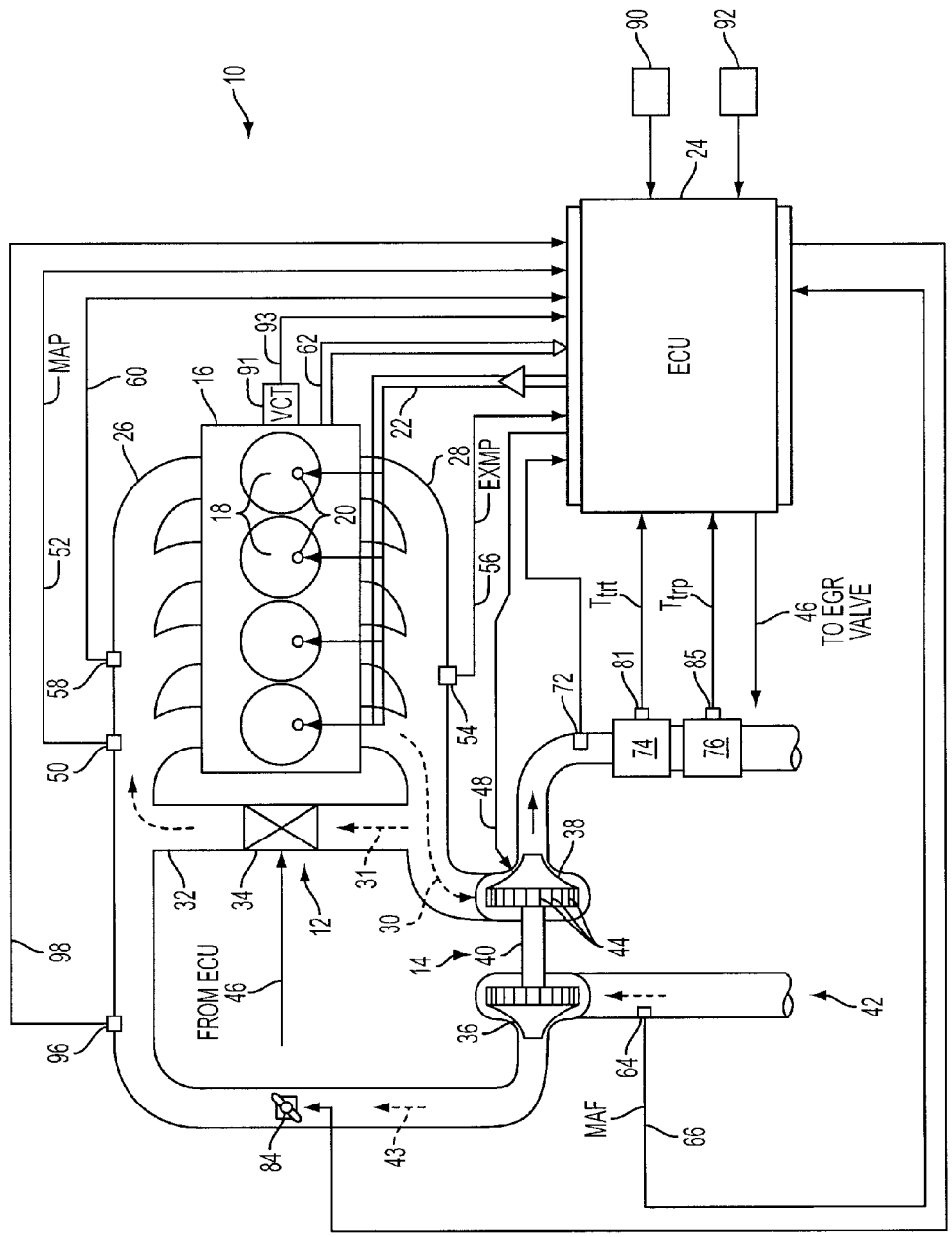
FIG. 2 is a schematic depiction of an exemplary embodiment of a diesel engine.

FIG. 1 is a schematic diagram of an example vehicle. In vehicle 20, engine 210, which may be a gasoline or diesel engine and which is described in more detail with regard to FIG. 2, is coupled to the transmission 218 which is mechanically coupled with wheel 214. In one example, transmission 218 may be an automatic transmission, and a torque converter (not shown) may be coupled between the engine and transmission. Alternatively, transmission 218 may be a manual transmission, or an automatic shift manual transmission, for example.

Brake 216 is coupled to wheel 214 and configured to brake the wheel relative to the vehicle. The brake may be hydraulically actuated, eletro-hydrualically actuated, electrically actuated, or various combinations thereof. For example, the brake may be actuated by a vehicle operator actuating a brake pedal and/or actuated via a command from the controller, such as via the electrical link 230 from controller 212. The brake may be a disc brake, drum brake, or any other type of brake coupled to a tire/wheel or hub of the vehicle's tire/wheel. In one example, the brake may be configured to be operated by either or both of the operator and controller, such as in an anti-lock braking system, for example.

FIG. 1 further shows controller 212 communicating with transmission 218. For example, the controller may send a plurality of signals to transmission 218, such as for controlling a plurality of hydraulic pressures in the transmission for activating/deactivating various clutches. In one example, as described in more detail herein, controller 212 may actuate one or more clutches in transmission 218 during an idle condition in response to a driver request in order to brake torque the engine (either via the transmission itself, or in combination with the vehicle brakes), thereby enabling increased engine loading and increased engine temperature generation.

Continuing with FIG. 1, controller 212 is also shown coupled to engine 210. While a single controller may be used to actuator the engine, brakes, transmission, etc., multiple controllers in a control system may also be used. In addition, controller 212 can accept a driver's input 224 such as a signal to regenerate emission control devices, as well as additional driver inputs such as from the gas pedal and brake pedal (not shown). Controller 212 can also receive a gear selection input from gear selector 220, which may be a transmission gear shift position (e.g., PRNDL).

FIG. 1 also shows an emission control device system 222 (see FIG. 2 for additional details), which may comprise one or more emission control devices in an exhaust passage downstream of the engine.

Turning to FIG. 2, there is shown a simplified schematic diagram of a diesel engine system 10 equipped with an exhaust gas recirculation (EGR) system 12 and a variable geometry turbocharger (VGT) 14. A representative engine block 16 is shown having four combustion chambers 18, although more or fewer cylinders may be used if desired. Each of the combustion chambers 18 includes a direct-injection fuel injector 20. The duty cycle of the fuel injectors 20 is determined by the engine control unit (ECU) 24 and transmitted along signal line 22. Air enters the combustion chambers 18 through the intake manifold 26, and combustion gases are exhausted through the exhaust manifold 28 in the direction of arrow 30.

In the depicted embodiment, the intake valves and exhaust valves (not shown) may be actuated by variable cam timing (VCT) 91 via signal line 93. In some examples, variable valve lift (VVL), cam profile switch (CPS), among other valve control systems may be used to adjust operation of one or more of the intake and/or exhaust valves. Alternatively, electric valve actuators (EVA) may be used to control operation of intake and exhaust valves, respectively. Each valve may be configured with a valve position sensor (not shown) that can be used to determine the position of the valve.

To reduce the level of NOx emissions, the engine is equipped with an EGR system 12. EGR system 12 comprises a conduit 32 connecting the exhaust manifold 28 to the intake manifold 26. This allows a portion of the exhaust gases to be circulated from the exhaust manifold 28 to the intake manifold 26 in the direction of arrow 31. An EGR valve 34 regulates the amount of exhaust gas recirculated from the exhaust manifold 28. The valve 34 may be a throttle plate, pintle-orifice, slide valve, or any other type of variable valve.

In the combustion chambers, the recirculated exhaust gas acts as an inert gas, thus lowering the flame and in-cylinder gas temperature and decreasing the formation of NOx. On the other hand, the recirculated exhaust gas displaces fresh air and reduces the air-to-fuel ratio of the in-cylinder mixture by reducing excess oxygen.

Turbocharger 14 uses exhaust gas energy to increase the mass of the air charge delivered to the engine combustion chambers 18. The exhaust gas flowing in the direction of arrow 30 drives the turbocharger 14. This larger mass of air can be burned with a larger quantity of fuel, resulting in more torque and power as compared to naturally aspirated, non-turbocharged engines.

The turbocharger 14 includes a compressor 36 and a turbine 38 coupled by a common shaft 40. The exhaust gas 30 drives the turbine 38 which drives the compressor 36 which, in turn, compresses ambient air 42 and directs it (arrow 43) into the intake manifold 26. The VGT 14 can be modified as a function of engine speed during engine operation by varying the turbine flow area and the angle at which the exhaust gas 30 is directed at the turbine blades. This is accomplished by changing the angle of the inlet guide vanes 44 on the turbine 38. The operating position for the engine guide vanes 44 is determined from the desired engine operating characteristics at various engine speeds and loads by ECU 24.

An aftertreatment device 74 may be disposed downstream of the turbine 38. Aftertreatment device 74 may include any suitable type of device for reducing emissions from engine 10. Examples include, but are not limitied to, three-way catalytic converters, NOx traps, oxidation catalyst, particulate filters, etc. In one example, the aftertreatment device is a diesel particulate filter. ECU 24 may be configured to periodically raise the temperature of particulate filters to regenerate the filters.

A lean nitrogen oxide (NOx) adsorbent or trap 76 is shown positioned downstream of aftertreatment device 74. NOx trap 76 is configured to adsorb NOx when engine 10 is operating with a lean air to fuel ratio. ECU 24 may be configured to periodically raise the temperature of NOx trap 76 and provide a rich or stoichiometric exhaust stream to NOx trap 76 (for example, by performing an additional injection of fuel after top dead center of the compression stroke) to react adsorbed NOx with HC and CO to purge the trap of contaminants, such as stored SOx.

All of the engine systems, including the EGR systems 12 and VGT 14, throttle valves 84, and fuel injectors 20 are controlled by the ECU. For example, signal 46 from the ECU 24 regulates the EGR valve position, and signal 48 regulates the position of the VGT guide vanes 44.

In the ECU 24, the command signals 46, 48 to the EGR system 12 and VGT 14 actuators, as well as other command signals, are calculated from measured variables and engine operating parameters. Sensors and calibratable lookup tables provide the ECU 24 with engine operating information. For example, manifold absolute pressure (MAP) sensor 50 provides a signal 52 to the ECU 24 indicative of the pressure in the intake manifold 26 downstream of the EGR entrance, and pressure sensor 96 provides a signal 98 indicative of pressure upstream of the EGR entrance in the intake manifold. Likewise, exhaust manifold pressure (EXMP) sensor 54 provides an EXMP signal 56 to the ECU 24 indicative of the pressure in the exhaust manifold 28 upstream of the EGR exit. Further, an air charge temperature sensor 58 provides a signal 60 to the ECU 24 indicative of the temperature of the intake air charge 42. A mass airflow (MAF) sensor 64 also provides signals 66 indicative of the airflow in the intake system to the ECU 24.

In addition, exhaust gas oxygen concentration, which can be indicative of air-fuel ratio, can be provided by oxygen sensor 72. Additional sensory inputs can also be received by the ECU along signal line 62 such as engine coolant temperature, engine speed, and throttle position. Further, ECU 24 is shown to receive signals from a gas pedal position from sensor 91 and a brake pedal position from sensor 93.

Exhaust gas sensor 72 is shown upstream of an aftertreatment device 74. Exhaust gas sensor 72 may be any of many known sensors for providing an indication of exhaust gas air/fuel ratio such as a linear oxygen sensor, a two-state oxygen sensor, or a hydrocarbon (HC) or carbon monoxide (CO) sensor. In this particular example, sensor 38 is a two-state oxygen sensor that provides signal EGO to controller 12 which converts signal EGO into two-state signal EGOs.

Controller 24 may determine the temperature of aftertreatment device 74 and NOx trap 76 in any suitable manner. For example, the temperature Ttrt of catalytic converter 74 and the temperature Ttrt of NOx trap 76 may be inferred from engine operation. In an alternate embodiment, temperature Ttrt is provided by temperature sensor 81 and temperature Ttrp is provided by temperature sensor 85.

Figure 3:
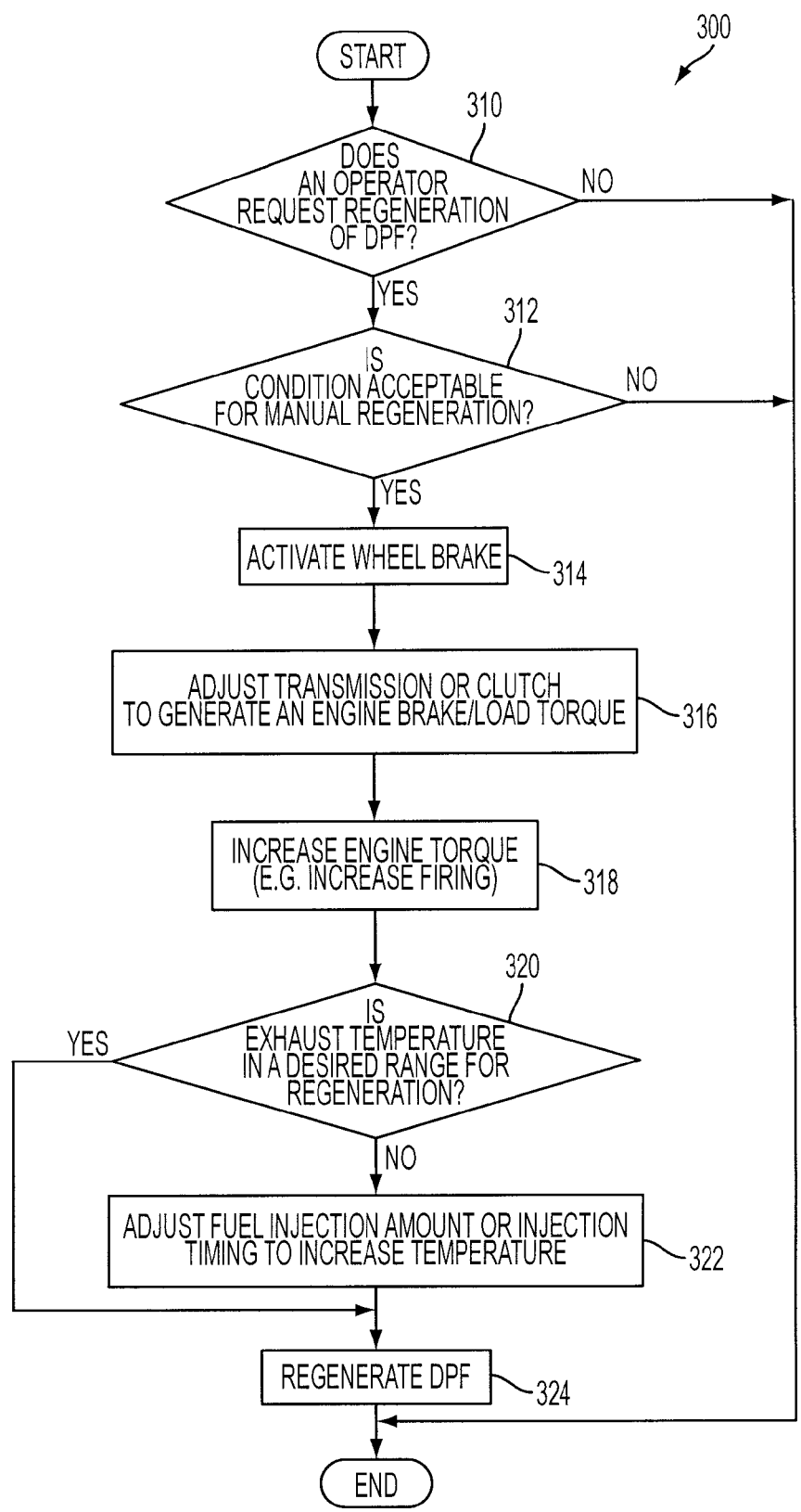
FIG. 3 is a flow diagram of one embodiment of a method to regenerate an emission control device.

It will be understood that FIG. 2 merely shows one example multi-cylinder engine, and that each cylinder has its own set of intake/exhaust valves, fuel injectors, etc. It will further be understood that the depicted diesel engine 10 is shown only for the purpose of example, and that the systems and methods described herein may be implemented in or applied to any other suitable diesel engine having any suitable components and/or arrangement of components FIG. 3 shows a flow diagram of one embodiment of a method to regenerate an emission control device. The routine 300 generally depicts a method to regenerate diesel particulate filter (DPF) of a diesel vehicle in response to a manual operator request. The routine, in 310, determines whether an operator has requested the regeneration of the particulate filter, e.g., via 224. The operator may be a driver of the vehicle. Alternatively, the operator may be a service person in a vehicle service center. In some embodiments, an operator may initiate the regeneration by turning on a regeneration button or switch in the vehicle, such as in the vehicle dashboard. In some embodiments, an alert signal may be incorporated into or disposed near the regeneration button to remind or indicate to the operator the need to regenerate a particulate filter. In some embodiments, the alert signal may be a LED, a lightened words or graph. If the answer to 310 is no, the routine ends. Otherwise, the routine continues to 312 where the routine determines whether the condition is acceptable for a manual regeneration. In one embodiment, the acceptable condition may be an idle condition of the engine of the vehicle. In another embodiment, the acceptable condition may be in a stopped vehicle state and when the selected gear is in "park", or "P". If answer to 312 is no, the routine ends. If answer is yes, the routine continues to 314.

Next in 314, the routine activates the wheel brake, e.g., by increasing braking force applied to the wheel. Then, the routine adjusts the transmission (e.g., one or more clutches of the transmission) to generate an engine brake/load torque in 316 and increases engine torque (e.g. increasing injected fuel) in 318. For example, the transmission may be placed in a locked or partially-locked gear position by actuating one or more clutches so that the transmission generates increased engine loading. Further, still further engine loading can be generated when further actuating one or more wheel brakes so that a coupling between the engine and brakes through the transmission can be utilized.

In this way, increased temperature may be generated in the exhaust that can be utilized to burn particulates absorbed on the particulate filter to thereby regenerate the filter. Further, increased temperatures may be generated when requested by an operator during stopped conditions, such as during engine idle conditions. Thus, by activating the wheel brake and adjusting transmission or clutch, the engine torque may be increased to generate the required exhaust temperature.

Continuing with FIG. 3, in 320, the routine determines whether the exhaust temperature is at or in a desired range for regeneration. If the answer is yes, the routine proceeds to 324 to regenerate the particulate filter. Otherwise, the routine, in 322, adjusts the fuel injection amount or injection timing to increase the temperature to a desired level. It should be noted that an exhaust throttle may further be optionally installed in the exhaust passage to further increase and/or adjust the exhaust temperature if desired. Next, the routine continues to 324 to regenerate the particulate filter.

In addition to the regeneration of particular filter, other emission control devices, such as a lean NOx trap, may be periodically regenerated to remove SOx. For example, the $NO_x$ trap may include one or more precious metals, and an alkali or alkaline metal oxide to which nitrogen oxides adsorb as nitrates when the engine exhaust has a lean air/fuel mixture. The engine can then be configured to periodically run a richer air/fuel mixture. The nitrates decompose under rich conditions, releasing the $NO_x$. This reacts with the carbon monoxide, hydrogen gas and various hydrocarbons in the exhaust over the precious metal to form $N_2$, thereby decreasing the $NO_x$ emissions and regenerating the trap.

The use of a $NO_x$ trap can substantially reduce $NO_x$ emissions from a lean-burning engine. However, $SO_2$ produced by the combustion of sulfur in fuel can form sulfates, which can degrade the $NO_x$ storage sites and lower the $NO_x$ storage capacity and conversion efficiency of the trap. However, the $NO_x$ storage capacity of the trap may be recovered by operating the trap for several minutes at a high temperature (for example, at a temperature between approximately 600 C and 800 C) under rich, stoichiometric, or oscillating lean-rich, conditions.

Figure 4:
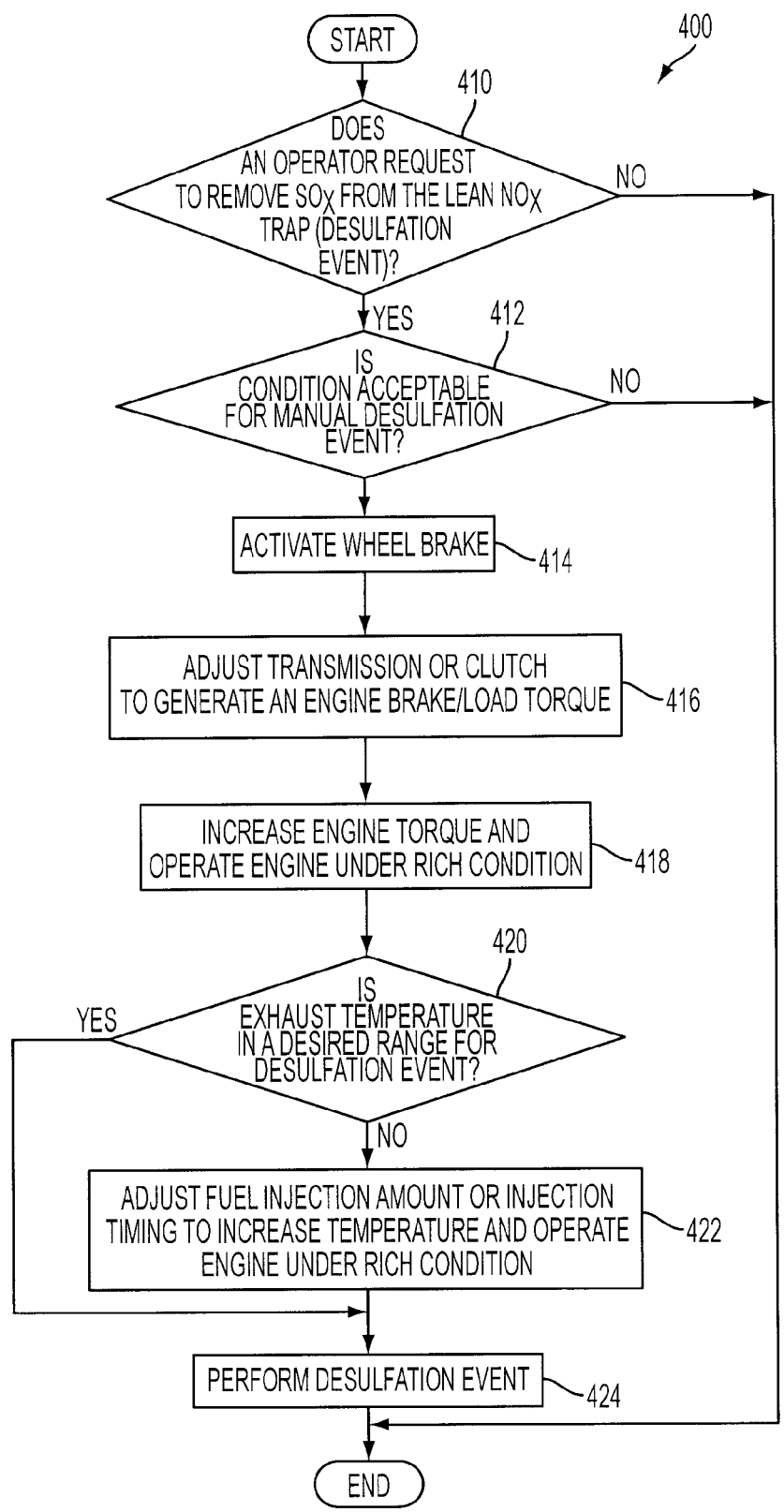
FIG. 4 is a flow diagram of another embodiment of a method to regenerate an emission control device.

A method similar to the routine described above may be used to remove SOx absorbed in a lean NOx trap, which may be initiated in response to a manual operator request. Referring now to FIG. 4, a flow diagram of another embodiment of a method to regenerate an emission control device is illustrated. The routine 400 generally depicts a method to remove SOx from a lean NOx trap. The routine, in 410, determines whether an operator request to remove SOx from the lean NOx trap or perform a desulfation event. The operator may be a driver of the vehicle. Alternatively, the operator may be a service person in a vehicle service center. In some embodiments, an operator may initiate the regeneration by turning on a regeneration button or switch in the vehicle, such as in the vehicle dashboard. Also in some embodiments, an alert signal may be incorporated into or disposed near the desulfation button to remind or indicate to the operator the need to execute the desulfation event. The alert signal may be a LED, lightened words, or graph. If the answer is no, the routine ends.

Otherwise, the routine continues to 412 and determines whether a condition is acceptable for initiating a desulfation event by an operator. In one embodiment, an acceptable condition may be an idle condition of the engine of the vehicle. In another embodiment, the acceptable condition may be in a stopped vehicle state and when the selected gear is in "park", or "P". Still other entry conditions may be used, such as a number of miles since a previous regeneration event, or others. If the answer is no, the routine ends.

If the answer is yes, the routine continues to 414 where the routine activates the wheel brakes, e.g., by increasing braking force applied to one or more wheels. Then, the routine adjusts the transmission (e.g., one or more clutches of the transmission) to generate an engine brake/load torque in 416 and increases engine torque (e.g. increasing injected fuel and inducted air) and adjusts exhaust air-fuel ratio (e.g., to rich, stoichiometric, or oscillating about stoichiometry) in 418. The exhaust air-fuel ratio may be adjusted via reductant injection in the exhaust, or via late injection via a direct cylinder injector during an exhaust stroke, for example.

As noted above, the transmission may be placed in a locked or partially-locked gear position by actuating one or more clutches so that the transmission generates increased engine loading. Further, still further engine loading can be generated when further actuating one or more wheel brakes so that a coupling between the engine and brakes through the transmission can be utilized. As noted above, increased temperatures may be generated when requested by an operator during stopped conditions, such as during engine idle conditions. Thus, by activating the wheel brake and adjusting transmission or clutch, the engine torque may be increased to generate the required exhaust temperature.

In this way, increased temperature may be generated in the exhaust that can be utilized to remove sulfates from the NOx trap by heating the trap for several minutes at a high temperature and operating the engine under selected exhaust air-fuel ratio conditions. For example, under rich conditions where the exhaust air/fuel ratio is below the stoichiometric ratio, reductants such as hydrocarbons and carbon monoxides may be present in the exhaust. When sulfates are purged from a NOx trap, they are mostly converted into sulfur dioxide (SO$_2$), hydrogen sulfide (H$_2$S), and carbonyl sulfide (COS) in the exhaust.

Continuing with FIG. 4, the routine, in 420, determines whether the exhaust temperature is in a desired range for desulfation. If the answer is yes, the routine proceeds to 424 to regenerate the particulate filter. Otherwise, the routine, in 422, adjusts the fuel injection amount, injection timing, and/or airflow amount to increase the temperature to a desired level. Again, it should be noted that an exhaust throttle may be optionally installed to further adjust the exhaust temperature if desired. Next, the routine continues to 424 to perform desulfation event.

It should be appreciated that in one embodiment, the regeneration of a particulate filter may be completed at the same time of a desulfation event. For example, the regeneration of multiple devices may occur at least partially at the same time, or may be sequentially performed so as to utilize only a single high temperature regeneration event.

The exemplary methods described in connection with FIGS. 3 and 4 have various advantages in some settings. For example, the regeneration of a particulate filter and desulfation of a lean NOx trap may be performed at set intervals under controlled conditions by an operator. Thus, high temperature excursions experience by an emission control device resulting from a regeneration or desulfation during certain driving conditions may be reduced. Further, a method to perform the regeneration or desulfation is provided to increase temperature under the controlled conditions. For example, the actuation of a vehicle wheel brake may have the effect of increasing engine load at certain engine operation conditions such as at idle state. Thus, exhaust temperature may be raised to a level required for the regeneration of a particulate filter and/or the desulfation of a lean NOx trap by increasing engine torque during braking. Similarly, adjusting transmission operation may also be used to increase engine loading, thus raising exhaust temperature sufficient for the regeneration and desulfation.

Furthermore, a regeneration and/or desulfation may be performed conveniently at controlled conditions. For example, since the regeneration of a particulate filter may occur approximately at fuel refill intervals, an operator may be reminded of initiating the regeneration approximately at the time of fuel refilling. Similarly, desulfation may occur roughly at oil change intervals. Again, an operator or a service person at a service center may be reminded of initiating the desulfation event approximately at the time of oil change. Thus, less time or less effort from the operator of a vehicle may be involved to execute the strategies to regenerate a particulate filter and desulfate a lean NOx trap.

As will be appreciated by one of ordinary skill in the art, the specific routines and block diagrams described above in the flowcharts may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the disclosure, but is provided for ease of illustration and description. Although not explicitly illustrated, one of ordinary skill in the art will recognize that one or more of the illustrated steps or functions may be repeatedly performed depending on the particular strategy being used. Further, these Figures graphically represent code to be programmed into the computer readable storage medium in controller 12.

It will be appreciated that the processes disclosed herein are exemplary in nature, and that these specific embodiments are not to be considered in a limiting sense, because numerous variations are possible. The subject matter of the present disclosure includes all novel and non-obvious combinations and subcombinations of the various camshaft and/or valve timings, fuel injection timings, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the injection and valve timing and temperature methods, processes, apparatuses, and/or other features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of regeneration of an emission control device in a diesel engine of a vehicle, the vehicle also including a wheel brake, comprising:
    receiving a regeneration request by an operator of the vehicle;
    activating the wheel brake and increasing engine torque generation by increasing diesel fuel injection during a stopped vehicle condition in response to the request to increase temperature in an exhaust, where the increased engine output torque generation is counteracted by wheel braking torque and the stopped vehicle condition includes an engine idle condition or a park condition; and
    regenerating the emission control device by the increased temperature produced.

2. The method of claim 1 wherein the emission control device is a particulate filter.

3. The method of claim 1 wherein the emission control device is a lean NOx trap.

4. The method of claim 3 further comprising operating at a rich exhaust air-fuel ratio during the regeneration.

5. The method of claim 1 wherein the operator is one of the driver of the vehicle and the service person of a vehicle service center.

6. The method of claim 1 wherein the regeneration is performed above a predetermined temperature caused by an increase in exhaust heat.

7. A method of regeneration of an emission control device in a diesel engine of a vehicle, the vehicle also including a transmission, comprising:
    receiving a regeneration request by an operator of the vehicle;
    adjusting transmission operation to engage at least one gear during a stopped vehicle condition and in response to the request to increase exhaust temperature, where the at least one gear of the transmission transmits torque from the engine through the transmission and the stopped vehicle condition includes an engine idle condition or a parked vehicle condition,
    increasing engine torque;
    counteracting the increased engine torque transmitted through the transmission via application of a vehicle wheel brake during the stopped vehicle condition; and regenerating the emission control device through the increased exhaust gas temperature.

8. The method of claim 7 wherein the emission control device is a particulate filter, and where the regeneration occurs during the stopped vehicle condition.

9. The method of claim 7 wherein the emission control device is a lean NOx trap.

10. The method of claim 9 further comprising operating at a rich exhaust air-fuel ratio during the regeneration.

11. The method of claim 7 wherein said adjusting transmission operation includes activating at least one hydraulic clutch of the transmission to engage at least one gear.

12. A method of regeneration of an emission control device in a diesel engine of a vehicle, the vehicle also including a wheel brake and a transmission, comprising:
receiving a regeneration request by an operator of the vehicle;
activating the wheel brake;
adjusting transmission state;
increasing engine torque; and
regenerating the emission control by increased exhaust temperature, the increased temperature being generated through a combination of at least increasing engine torque by increasing diesel fuel injection during activated wheel brake operation in the adjusted transmission state, where the increased engine torque is transmitted through the transmission and counteracted by the activated wheel brake at a stopped vehicle condition wherein the stopped vehicle condition includes an engine idle condition or a parked vehicle condition.

13. The method of claim 12 wherein the emission control device is a particulate filter.

14. The method of claim 12 wherein the emission control device is a lean NOx trap.

15. The method of claim 14 wherein said adjusting transmission operation includes activating at least one hydraulic clutch of the transmission to engage at least one gear so that torque may be at least partially transmitted from the engine to the wheel.

16. The method of claim 15 wherein activating the wheel brake includes electronically activating an automatic wheel brake of the vehicle so that engine brake loading may be provided.

17. The method of claim 16 wherein the stopped vehicle condition includes an engine idle condition or a parked vehicle condition.

* * * * *